US012684069B2

(12) United States Patent　(10) Patent No.:　US 12,684,069 B2
Naidoo et al.　(45) Date of Patent:　Jul. 14, 2026

(54) CUSTOMIZATION OF A METAVERSE ENVIRONMENT BASED ON CUSTOMER PREFERENCES

(71) Applicant: Mitel Networks Corporation, Kanata (CA)

(72) Inventors: Logendra Naidoo, Ottawa (CA); Anilkumar Yalawarmath, Attiguppe Bengaluru (IN)

(73) Assignee: Mitel Networks Corporation, Kanata (CA)

( * ) Notice: Subject to any disclaimer, the term of this patent is extended or adjusted under 35 U.S.C. 154(b) by 257 days.

(21) Appl. No.: 18/392,919

(22) Filed: Dec. 21, 2023

(65) Prior Publication Data

US 2025/0150533 A1　May 8, 2025

(30) Foreign Application Priority Data

Nov. 8, 2023　(IN) ............................. 202311076296

(51) Int. Cl.
| *H04M 3/00* | (2024.01) |
| *G06F 3/01* | (2006.01) |
| *G06T 11/00* | (2006.01) |
| *H04M 3/51* | (2006.01) |

(52) U.S. Cl.
CPC ........... *H04M 3/5183* (2013.01); *G06F 3/011* (2013.01); *G06T 11/00* (2013.01)

(58) Field of Classification Search
CPC ....... H04M 3/5183; G06F 3/011; G06T 11/00
USPC ....... 379/265.01–265.14, 266.01–266.1, 309
See application file for complete search history.

(56) References Cited

U.S. PATENT DOCUMENTS

| 7,143,358 | B1 * | 11/2006 | Yuen ..................... G06F 16/954 |
| | | | 715/757 |
| 7,319,992 | B2 * | 1/2008 | Gaos ................ H04N 21/47805 |
| | | | 706/62 |
| 7,529,690 | B2 * | 5/2009 | Hadi ................... G06Q 30/0617 |
| | | | 705/27.2 |
| 7,729,951 | B2 * | 6/2010 | Dawson ............. G06Q 30/0603 |
| | | | 705/27.2 |
| 8,370,207 | B2 * | 2/2013 | Edwards ........... G06Q 30/0201 |
| | | | 705/26.1 |
| 10,429,923 | B1 * | 10/2019 | Johnston ................. G06F 3/011 |
| 10,636,212 | B2 | 4/2020 | Tamaoki et al. |

(Continued)

FOREIGN PATENT DOCUMENTS

| CN | 101730891 | 6/2010 |
| WO | 2019199569 | 10/2019 |

OTHER PUBLICATIONS

Hensen Benedikt et al, "ImPres: An Immersive 3D Presentation Framework for Mixed Reality Enhanced Learning", Nov. 3, 2021, Advanced Community Information Systems, Chair of Computer Science 5, RWTH Aachen University, Aachen, Germany.

*Primary Examiner* — William J Deane, Jr.

(57)　ABSTRACT
A computer system that creates a virtual reality (VR), or metaverse, commerce space, includes a VR library that stores VR commerce space elements, a VR rendering engine in communication with the VR library, a call center server in communication with the VR rendering engine. The VR rendering engine selects one or more VR elements and creates a VR commerce space based on one or more customer preferences. The VR commerce space is transmitted to the call center server, which communicates the VR commerce space to a customer device and optionally to an agent device.

20 Claims, 3 Drawing Sheets

(56) References Cited

U.S. PATENT DOCUMENTS

| | | | | |
|---|---|---|---|---|
| 10,872,322 | B2 | 12/2020 | Siddique et al. | |
| 11,257,096 | B1 | 2/2022 | Webster | |
| 11,449,189 | B1* | 9/2022 | Bond | G06F 3/0482 |
| 12,556,634 | B1* | 2/2026 | Guerra | H04M 3/527 |
| 2002/0040332 | A1* | 4/2002 | Maari | G06Q 30/0633 |
| | | | | 705/26.8 |
| 2002/0107756 | A1* | 8/2002 | Hammons | G06Q 30/06 |
| | | | | 705/26.8 |
| 2005/0177463 | A1* | 8/2005 | Crutchfield | G06Q 30/06 |
| | | | | 705/27.2 |
| 2005/0261980 | A1* | 11/2005 | Hadi | G06Q 30/0617 |
| | | | | 705/27.2 |
| 2008/0043013 | A1* | 2/2008 | Gruttadauria | G06Q 30/02 |
| | | | | 345/419 |
| 2009/0037291 | A1* | 2/2009 | Dawson | G06Q 30/0603 |
| | | | | 705/27.2 |
| 2009/0158170 | A1* | 6/2009 | Narayanan | H04L 67/131 |
| | | | | 715/753 |
| 2010/0131876 | A1* | 5/2010 | Mcguire | A63F 13/79 |
| | | | | 715/848 |
| 2016/0330508 | A1 | 11/2016 | Newell et al. | |
| 2018/0136814 | A1 | 5/2018 | Parekkadan et al. | |
| 2018/0137681 | A1 | 5/2018 | Chang et al. | |
| 2018/0232340 | A1 | 8/2018 | Lee | |
| 2018/0356885 | A1* | 12/2018 | Ross | G06F 3/011 |
| 2020/0328908 | A1* | 10/2020 | Howland | H04L 9/008 |
| 2021/0004405 | A1 | 1/2021 | Solomon et al. | |
| 2021/0011899 | A1 | 1/2021 | Olivier et al. | |
| 2021/0049822 | A1 | 2/2021 | Meriaz et al. | |
| 2021/0248304 | A1 | 8/2021 | Olivier et al. | |
| 2022/0207818 | A1* | 6/2022 | Allen | G06T 19/006 |
| 2022/0222878 | A1 | 7/2022 | Raman et al. | |
| 2022/0392176 | A1* | 12/2022 | Malik | G06F 16/40 |
| 2023/0216956 | A1* | 7/2023 | Nesargi | H04M 3/5141 |
| | | | | 379/265.09 |
| 2023/0306484 | A1 | 9/2023 | Van Wie et al. | |
| 2024/0281052 | A1* | 8/2024 | Le Chevalier | G06F 3/011 |
| 2025/0111172 | A1* | 4/2025 | Breitweiser | G06F 40/56 |
| 2025/0150533 | A1* | 5/2025 | Naidoo | G06F 3/011 |

* cited by examiner

CUSTOMIZATION OF A METAVERSE ENVIRONMENT BASED ON CUSTOMER PREFERENCES

CROSS-REFERENCE TO RELATED APPLICATION

This application claims priority to India Provisional Patent Application No. 202311076296, entitled "Customization of a Metaverse Environment Based on Customer Preferences" filed on Nov. 8, 2023, the entire contents of which is incorporated herein by reference.

FIELD OF THE DISCLOSURE

This disclosure relates to creating a metaverse environment for customers in order to enhance their experience with a product or service provider. U.S. patent application Ser. No. 17/571,148, entitled Adoptable Presentation Format for Virtual Reality Constructs, which was filed on Jan. 7, 2022 is incorporated herein by reference.

BACKGROUND OF THE DISCLOSURE

Individuals or customers often communicate via traditional call, chat, or email to a customer service center to request support for a host of reasons. The interactions could be for essentially any purpose. For example, it could be related to assistance with a product or service, or related to an emergency or a hotline for a physical or mental health crisis. Known customer service centers accommodate customer preferences by, for example, analyzing customer distinctions and assigning a customer service agent that has sentiment scores, or possesses hard/soft skills, which correlate to the customer's problem, preferences, demeanor, or to an agent who is currently available. Some known systems and methods consider information such as the product or service purchased by the customer and/or past customer support issues/tickets with the same customer.

Meeting online (chat or video) is presently limited in its ability to enhance the customer experience, because of, for example, the shortcomings of pretext markup language (HTML) or codecs to increase the clarity of the audio and video. Additionally, call centers primarily focus only on resource management (such as automatic call distribution (ACD) or agent routing) and knowledge management (selecting and/or preparing an agent for the customer call) in tailoring the experience for a customer. A knowledge base can also be leveraged to share context about why the person who is calling (e.g., a person is located in rural Nebraska, or a person always calls about problems with internet gaming applications). Customers who have prior experience with certain issues or products receive better support by relaying this information in advance to the call center.

Contact center systems are thus equipped to route incoming calls to the proper agents. Interactive voice responses (IVRs) can implement a user-interface design that uses audio prompts. The situational reality, however, at either end of the call remains unchanged; the agent is at a call center with a computer screen and/or phone, and the customer is on his/her computer and/or phone.

Even if the call center knew the reason for the person's call beforehand (e.g., "I need party supplies for a wedding reception"), it likely would not result in major adjustments to the customer experience other than assigning an agent with different skills suited to the person's inquiry/problem.

A metaverse-based customer care center aims to make the customer experience personal and enjoyable. Unlike an online support desk with chat and video capabilities, or a call center, the metaverse extends customer relationship management (CRM) by taking advantage of virtual reality (VR) (also called a metaverse or a three-dimensional (3D) space). CRM factors are not being optimized in known versions of metaverse applications. Today, such metaverses are constrained due to static support practices, such as communications between a customer and the customer service center being through a website or telephone call. Existing VR spaces do not have the tools or options to customize the VR space sufficiently, but instead basically provide a generic "one size fits all" VR space. If a metaverse fails to stimulate a customer because it is not customized based on customer preferences, a business or sales opportunity may be missed.

SUMMARY

An improved CRM method provides customer service in a customized metaverse. The metaverse is a VR world in which users can interact, play games, and experience digital objects much as they would in the real world with a physical environment. A metaverse-based customer service center can provide customer service that is more personal for the customer. Systems and methods of this disclosure consider a customer's likes/interests (such as those located on a stored profile, social media activity, or based upon input by the customer) and/or the customer's preferences based on previous customer service tickets, including reasons for the customer's call, and then uses the information to create/modify a metaverse call center space so that it is more friendly for each unique customer. Furthermore, preferences that suit a particular customer could be added to a database and be applied again in the metaverse.

With the metaverse, information can be applied situationally (e.g., based on essentially any personal preference such as gender, creativity, desired avatars, colors, sounds, music, simulated product or service environments, and backgrounds), to produce a customized metaverse.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
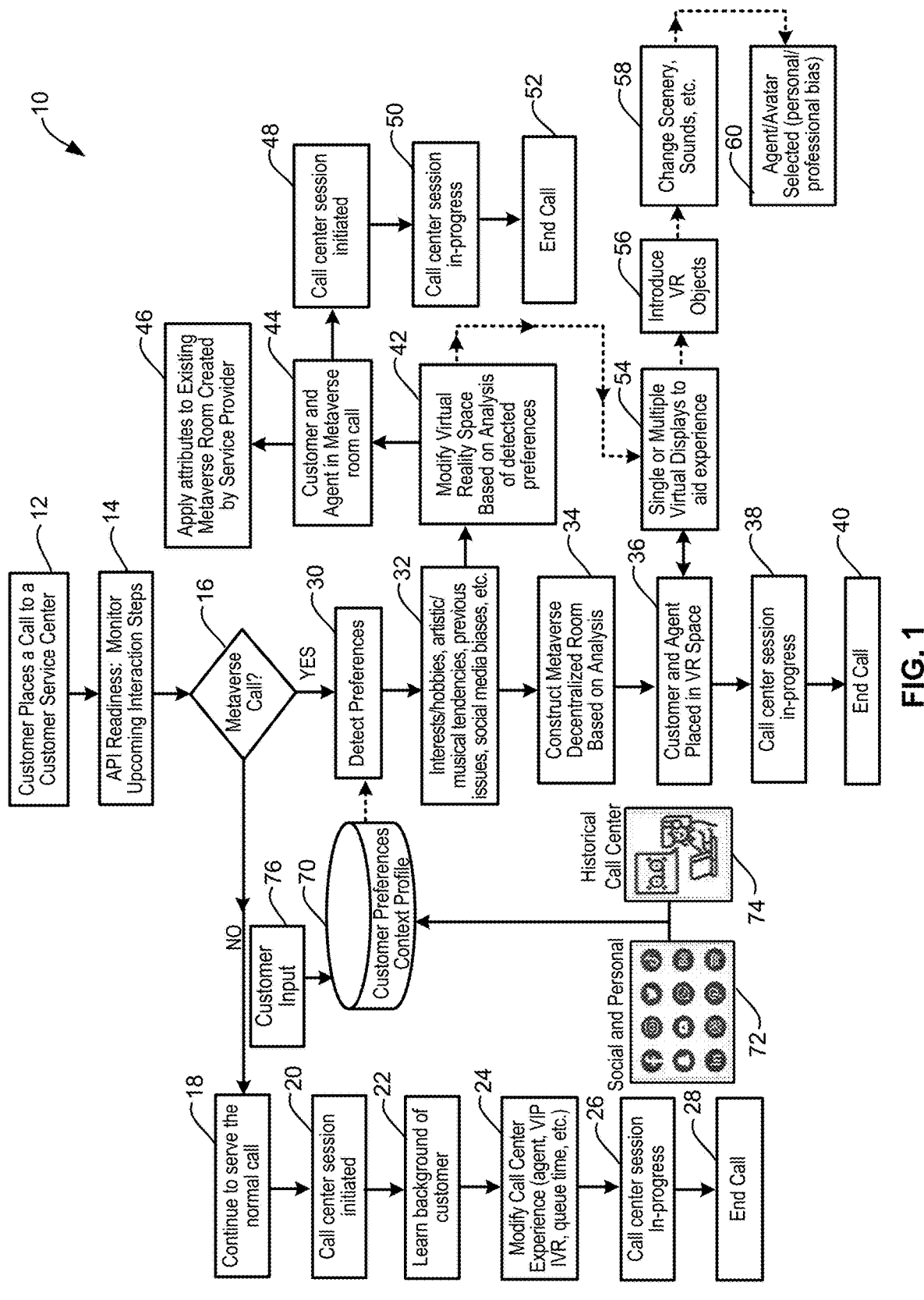
FIG. 1 is a block diagram of a process flow of customer preferences applied in virtual space according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

This disclosure describes systems and methods that, among other things: (1) determine the personal and business-related preferences of a customer, and perhaps of the organization providing customer service to the customer in a metaverse, (2) create or modify the VR space based on accommodating CRM factors, and/or (3) administer changes to the VR space that are intended to improve customer satisfaction score (CSAT). For example, if a customer prefers home visits rather than going to a storefront for help, the metaverse's virtual surroundings will change to reflect that customer preference. Information about customer preferences may be found in any suitable manner, such as through one or more of the customer's social media profiles, past history with the customer service center, or the customer's requests after contacting the customer service center.

The analysis of a customer's multitude of preferences leads to the setting of certain variables that are included within a metaverse. For example, knowing that a customer's social media shows an affinity for Miami Beach pictures could result in the metaverse-based space to be changed to a café scene on Ocean Drive in Miami. Or, if the customer is likely calling about a problem with a Cisco® UCS C-Series Rack Server the customer previously called about, a VR object could be added to the metaverse space to aid in the discussion regarding a fault in the Server and corrective action.

A system and method according to this disclosure may, using a VR rendering engine connected to a one or more VR libraries of stored VR commerce space elements and other VR images, which have different looks and feels, could recall or create a VR commerce space with which the customer desires and/or is already familiar.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

Turning now to the Figures, wherein the purpose is to describe embodiments of this disclosure and not to limit the scope of the claims, FIG. 1 shows an exemplary process flow (or method) 10 according to this disclosure. At step 12 a customer places a call utilizing a customer device to a customer support center via a call center server 118. At step 14 an application programming interface (API) determines at step 16, by monitoring upcoming interaction steps, whether the customer call is a metaverse call or not a metaverse call.

If the API determines at steps 14 and 16 that the call is not a metaverse call, the call is handled as a normal (which means a non-metaverse) call at step 18. A normal call is handled utilizing any suitable method. In the method illustrated, the call is routed to a call center at which a call center session is initiated (step 20). The background of the customer may be determined (step 22) by one or more of (1) utilizing a database of prior calls from the same customer, (2) by prompting the customer regarding the purpose of the call, or products or services to which the call relates, (3) accessing social media information of the customer, and/or (4) by analyzing the customer's voice to detect the customer's emotional state. These are exemplary only and there may be other ways to determine aspects of a customer's background.

At step 24, the call center experience may be IVR modified for the customer based on the background information obtained at step 22. An agent may be selected specifically to handle the particular customer's call and the agent may be selected based on one or more factors, such as agent availability (thus reducing the queue time), past experience with the customer, familiarity with the customer's product or service, or applicable hard skills and/or soft skills. The customer may be also identified as being very important (e.g., a VIP).

The call center session is then in progress at step 26 and the call ends at step 28.

Metaverse Call

If the call is identified at step 16 as a metaverse call the system 100 (described further below) and method 10 detect and/or obtain stored preferences (step 30) of the customer to create and/or modify a metaverse (i.e., VR commerce space) for the customer. In this embodiment, the customer preferences are stored in a customer-preference context profile (or customer-preference database) 70, which draws customer preferences from (1) the customer's social and personal database 72, which may be in communication with a social media server that can access the customer's social media account(s) and could include one or more of interests, hobbies, musical tendencies, travel experiences, favorite places, background sounds, or other information, (2) prior (or historical) call center communications database 74 with the customer, which could include previously-selected metaverse preferences of the customer, prior problems and products or services to which the problem related, recent product or service purchases by the customer, or any relevant historical information, and/or (3) customer input 76 during the customer service contact, for selected preferences provided by the customer (such as by voice input) via transmission through the customer device to the call center server 118 and routed to the customer preference database, such as "change the background" to a beach, mountain, forest or other background, and/or "change the agent voice" and/or "change the agent appearance," or other request. The customer may be (a) a potential purchaser of a product or service, (b) a person with a repair, warranty, or trouble-shooting question about a product or service, (c) a person in danger or distress and with a need for law-enforcement or other emergency services, (e) a member of an organization in need of information about an aspect of the organization or the organization's services, (f) a member of a social media network, or (g) a member of a special-interest group related to business or social activities. The agent may be (a) a product sales agent or service sales agent, (b) a product repair or trouble shooting agent or service repair or trouble shooting agent, (c) a law enforcement employee, (d) an emergency services call-center agent, (e) an emergency services provider, (f) a member of an organization to which the customer belongs, wherein the member is providing information to the customer, (g) a social media contact of the customer, or (h) a member of a special-interest group related to business or social activities.

Alternatively, the customer could enter a request using a user interface, such as a keyboard or touch screen. In an example of utilizing the invention the customer could create a metaverse having a beach background with ocean sounds and a Labrador Retriever agent speaking English with a Scottish accent. The metaverse (i.e., VR commerce space) is created by the VR rendering engine and could include virtual buildings, furniture, people, animals, music, sounds such as waves, jungle, forest, weather conditions such as sunny, raining, or snowing, and/or other settings (step 32).

At step 34 the metaverse is constructed by the VR rendering engine by utilizing VR commerce space elements, VR images, customer preferences, and/or other available data, based on an analysis of the customer preferences at steps 30 and 32. At step 36 the customer and agent are placed in the metaverse, although the agent's presence in the metaverse is optional. The customer and/or agent may appear in the metaverse as any suitable person, animal, being, or object. The call center session then is in progress at step 38 and the call ends at step 40.

In a modification of the method 10, after step 32 at step 42 a standardized metaverse is provided and then modified by the VR rendering engine based on an analysis of the customer's preferences. The modification of the metaverse may be done in any manner previously described. The customer and agent (optional) are then placed in the metaverse (step 44), and attributes can be applied to the metaverse by the agent utilizing a call center server 118, or automatically by call center server 118 based on the nature of the customer's contact (step 46). As an example, if the customer's contact is about a printer problem, the agent may direct call center server 118, or call center server 118 may automatically, display a 3D image of the printer in the metaverse so the customer can better explain the problem and the agent can better walk the customer through the troubleshooting steps. The metaverse customer service session is initiated at step 48, is in progress at step 50, and ends at step 52.

Another modification to method 10 is a branch that can emanate from either step 36 or step 42. The system 100 and method 10 can utilize single or multiple virtual displays at step 54 and optionally introduce VR objects into the metaverse at step 54, such as to change the scenery or sounds (step 58), and/or add agent or customer avatars at step 60.

Figure 2:
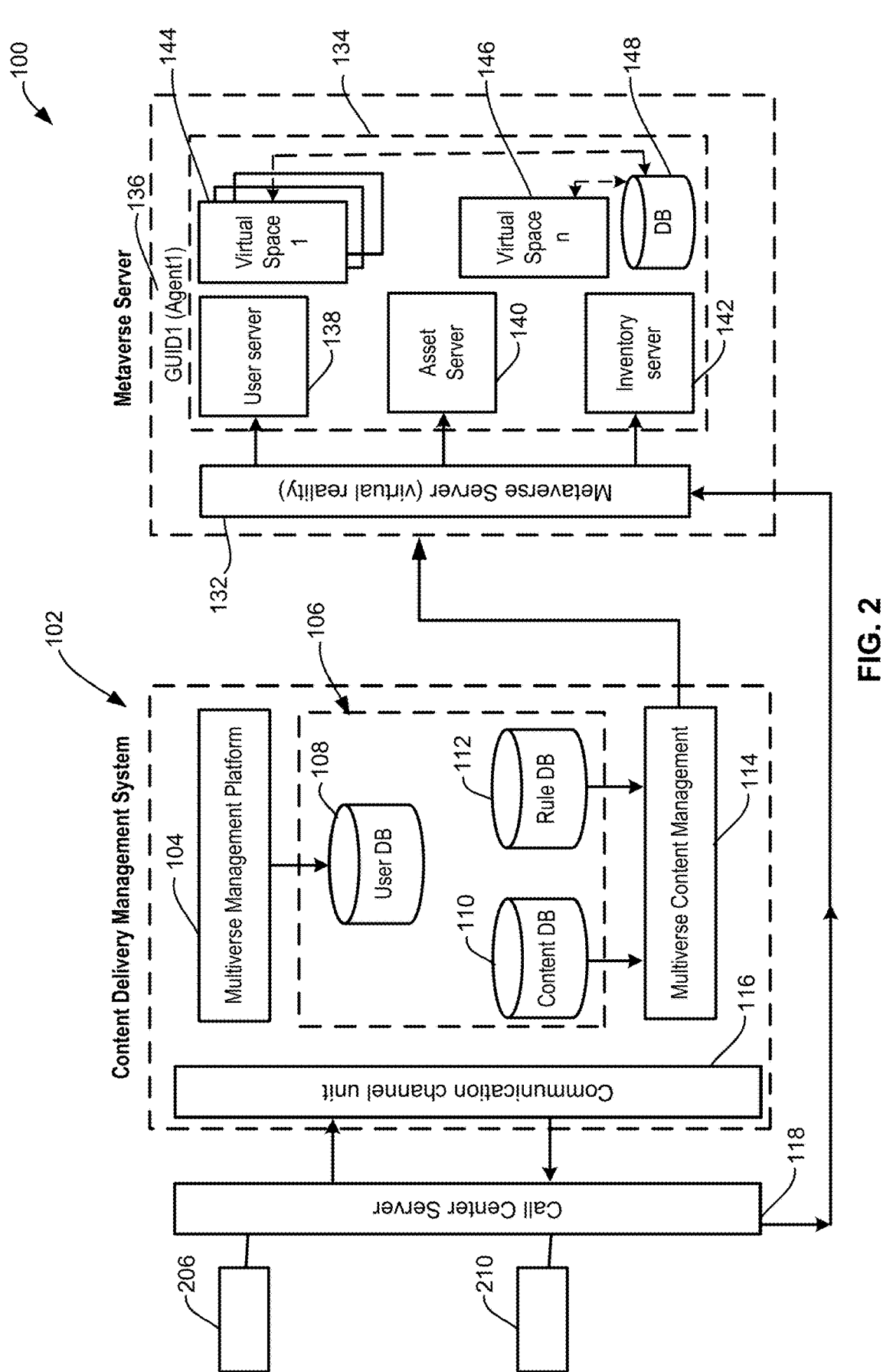
FIG. 2 is a block diagram of a content delivery management system and a metaverse system according to aspects of this disclosure.

Turning to FIG. 2 a system 100 according to aspects of this disclosure is illustrated. System 100 includes a content delivery management system (CDMS) 102 that communicates with a metaverse server (or VR rendering engine) 130.

CDMS 102 includes a metaverse management platform 104, a user database 108, a content database 110, a rule database 112, a multiverse content management processor 114, and a communication channel unit 116 that communicates with a customer service center server 118 that can communicate with a customer service center agent device 206, a customer device 210, and a metaverse server 132.

Multiverse content management server 114 communicates with metaverse server 132 of server 130. Metaverse server 132 is in communication with a user server 138, an asset server 140, and an inventory server 142. Server 130 creates the metaverse spaces 1-N, which are designated by reference characters 144, 146, and these spaces can be stored in database 148 and retrieved later, such as for a particular customer. There is no limit as to how many metaverses can be created and stored. The metaverse space also preferably includes an agent (or call center agent) 136, although this is optional.

Figure 3:
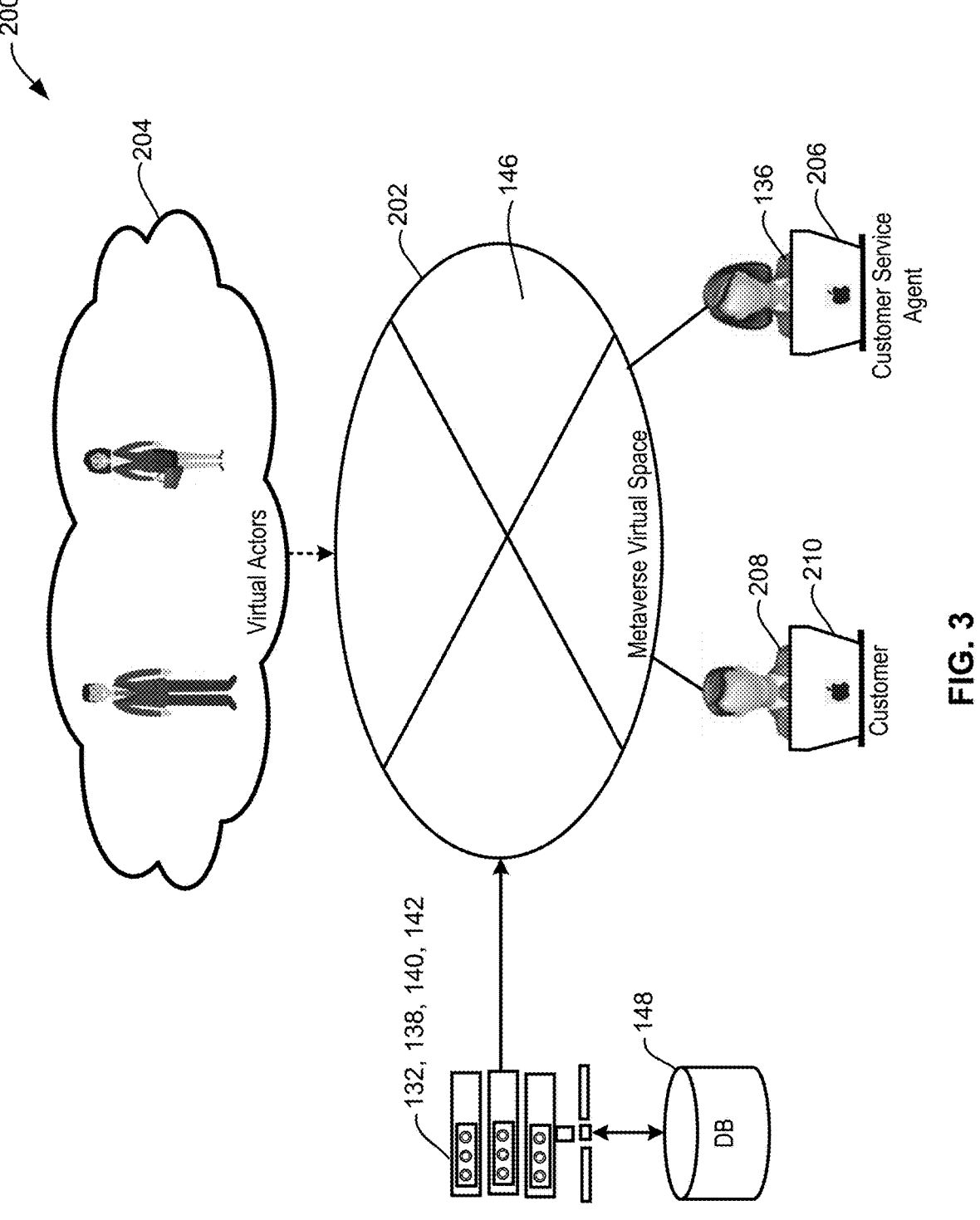
FIG. 3 is a view of conceptualization of a metaverse customer management system according to aspects of this disclosure.

Turning to FIG. 3, one example of a virtual network 200 is illustrated. Network 200 includes a metaverse 202 created by the operation of servers 132, 138, 140, and 142, and data inputted by the customer, agent and/or any of databases 108, 110, 112, and 148. A customer 208 can enter the metaverse 202 utilizing a customer device 210 in communication with call center server 118. A call center agent 136 can enter the metaverse 202 utilizing agent device 206, which is also in communication with call center server 118. To enter the metaverse, the customer and agent may, respectively, require special goggles, a visor, glasses, computer or other device screen, or a screen enhancer that would fit on an existing screen. Virtual actors or participants 204 may be present in the metaverse 202 and would be stored in content database 110 and/or database 148.

Customer preferences for typical customer service centers can be stored in database 148, user database 108, or elsewhere, and they can include any suitable information including purchasing behaviors, pain points, psychographic data (person's values, attitudes, interests and personality traits), demographic data (such as age, race, and sex), or any other relevant information.

The insight gained from a customer's VR preferences profile may allow the customer to choose from menu settings presented in the VR space and stored in a database, such as database 108 or database 148. A customer may then be presented with virtual preferences to augment the VR space. The settings are options based on what the customer service center has detected based on what the customer selects or modifies, or has previously selected.

In the metaverse 202, enhanced VR spaces can include artistic tendencies, musical interests, sentiment, and/or memorable events (e.g., the unveiling of a new iPhone as posted to a customer's social media feed). The customer could, in examples of this disclosure, potentially upload photographs that are used to alter the appearance of the metaverse 202. Even additional profile-related status indicators such as job title, relationship status, biometrics such as energy levels, sleep patterns, etc., could be used to improve CSAT in the metaverse 202. In some cases, the customer service center may have more than just one agent present in a metaverse or more than one customer in a metaverse.

When a customer is in the metaverse 202, the customer's virtual surroundings may be altered, to some degree, to what the agent or customer service center prefers. The modification of the metaverse considers the preferences of the customer, although in some instances business necessity could override certain customer preferences to achieve the purpose of the call and to ensure a level of professionalism. But the customer service center should preferably consider business needs and override customer preferences only for functional or professional purposes.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A computer system configured to create a virtual reality (VR) commerce space, the computer system comprising:

a VR library configured to store VR commerce space elements;

a VR rendering engine in communication with the VR library and configured to create the VR commerce space utilizing one or more of the VR commerce space elements;

a call center server in communication with the VR rendering engine and configured to facilitate communication between a customer device associated with a customer and an agent device and prompt the customer regarding a purpose of the communication; and wherein the VR rendering engine is configured to select one or more VR elements and create the VR commerce space based on an analysis of one or more customer preferences and the purpose of the communication and transmit the VR commerce space to the call center server, which is configured to transmit the VR commerce space to the customer device.

2. The computer system of claim 1, wherein the call center server is further configured to communicate with a social media server and access a social media account of the customer in order to obtain preferences of the customer and the call center server is configured to store the preferences of the customer in a customer preference database.

3. The computer system of claim 1 that further includes a customer preference database configured to store preferences of the customer based on information from one or more of (a) prior communications with the customer, (b) the customer's selected preferences transmitted by the customer device to the call center server and routed to the customer preference database, and (c) social media content related to the customer.

4. The computer system of claim 3, wherein the VR rendering engine creates the VR commerce space based on one or more of (a) VR commerce space elements stored in the VR library, (b) input from the customer device, and (c) preferences of the customer stored in the customer preference database.

5. The computer system of claim 1, wherein the customer device includes an electronic display configured to display the VR commerce space.

6. The computer system of claim 5, wherein the customer device comprises a visual aid for the customer that assists the customer in viewing the virtual reality commerce space, and wherein the visual aid is one or more of: goggles, glasses, a VR headset, an augmented reality (AR) headset, a projector, and a screen configured to be positioned on a display of the customer device.

7. The computer system of claim 1, wherein the VR rendering engine is conjured to create the VR commerce space having a rendered landscape and one or more of: (a) a virtual call center agent, (b) a picture, (c) a product, (c) a service, (d) a sound associated with the rendered landscape, and (e) music.

8. The computer system of claim 1, wherein the VR rendering engine is configured to create an initial VR commerce space at least in part based on the purpose of the communication and to provide the customer the option of utilizing the customer device to transmit a message to the call center server to instruct the VR rendering engine to select a VR commerce space different from the initial VR commerce space or to modify the initial VR commerce space.

9. A computer-implemented method operable on a computer system, wherein the computer system comprises a VR library the stores VR commerce space elements, a VR rendering engine in communication with the VR library, a call center server in communication with the VR rendering engine, and a customer preference database in communication with the call center server and with the VR rendering engine, the method comprising the steps of:

the call center server receiving a communication from a customer device associated with a customer;

the call center server identifying a purpose of the communication from the customer;

the call center server communicating the customer's name, the purpose of the communication, and inquiry to the VR rendering engine;

the VR rendering engine accessing the VR library and the customer preference database, and rendering a VR commerce space based on information obtained from one or both of each of the VR library and the customer preference database or from the purpose of the communication;

the VR rendering engine transmitting the VR commerce space to the call center server; and the call center server communicating the VR commerce space to the customer device.

10. The computer-implemented method of claim 9 that further includes the step of displaying the virtual reality VR commerce space on a display of the customer device.

11. The method of claim 10, wherein the customer device includes a camera configured to map movement of the customer watching the displaying of the VR space, and that further includes the step of the call center server mapping movement of the customer and altering the appearance of the VR commerce space based on the customer's movement.

12. The computer-implemented method of claim 11, wherein the customer can (a) look or swipe up, (b) look or swipe down, (c) look or swipe right, and (d) look or swipe left, in order to view different information in the VR commerce space.

13. The computer-implemented method of claim 9, wherein the call center server transmits menu settings to the customer device and the menu settings permit the customer to send commands to the call center server to (a) reject the VR commerce space, (b) select a new VR commerce space different from the VR commerce space, or (c) modify the VR commerce space.

14. A computer system configured to create a VR commerce space, the computer system comprising:

a VR library configured to store VR commerce space elements including elements related to prior customer inquiries;

a VR rendering engine in communication with the VR library and configured to create the VR commerce space based on a customer inquiry using at least one of VR commerce space elements stored in the VR library;

a call center server in communication with the VR engine and configured to communicate with a customer device and receive the customer inquiry, and configured to communicate with an agent device; and a customer preference database that includes customer preference information related to a customer's job, education, prior work experience, hobbies, friends, travel experiences and locations, address, age, biometrics, and prior calls to the call center server;

wherein the VR rendering engine is configured to create a VR commerce space based on information in the VR database, information in the customer preference database, and the customer inquiry.

15. The computer system of claim 14, wherein (a) utilizing the agent device in communication with the customer call center, an agent can totally or partially override (i) the VR rendering engine's created VR commerce space, (ii) a customer's selected VR commerce space if deemed necessary to achieve the purpose of the customer inquiry, or (iii) cause the customer to exit the VR commerce space, or (b) utilizing the customer device the customer can exit the VR commerce space.

16. The computer system of claim 14, wherein the call center server is configured to permit (a) a plurality of customer devices to simultaneously view one VR commerce space, and/or (b) a plurality of agent devices to simultaneously view one VR commerce space, such that a plurality of customers and/or a plurality of agents can simultaneously interact within the VR commerce space.

17. The computer system of claim 14, wherein the VR rendering engine is configured to include in the VR commerce space one or more virtual occupants who may or may not interact with the customer.

18. The computer system of claim 14, wherein the call center server is configured to transmit a menu of settings visible on a screen of the customer device, wherein the menu settings are configured to permit the customer to select the VR commerce space or modify the VR commerce space.

19. The computer-implemented method of claim 14, wherein the call center server transmits to the customer device a plurality of options for the VR commercial space and the customer device is configured to communicate to the call center server (a) which of the options the customer prefers, (b) a new rendered landscape, or (c) other new VR commerce space elements, and the call center database is configured to store the new rendered landscape or other new VR commerce space elements into the customer preference database.

20. The computer system of claim 14, wherein the VR library further includes a plurality of animated call center agent figures and call center agent voices from which the customer can select by transmitting a selection from the customer device to the call center server, which routes the customer selection to the VR rendering engine.

* * * * *